(12) United States Patent
Illi

(10) Patent No.: US 6,213,291 B1
(45) Date of Patent: Apr. 10, 2001

(54) VIBRATING CONVEYOR WITH DISTRIBUTION CHANNEL SWITCHING SYSTEM

(75) Inventor: Thomas Illi, Ellikon an der Thur (CH)

(73) Assignee: Kramer AG Bassersdorf, Bassersdorf (CH)

( * ) Notice: Subject to any disclaimer, the term of this patent is extended or adjusted under 35 U.S.C. 154(b) by 0 days.

(21) Appl. No.: 09/331,122

(22) PCT Filed: Oct. 2, 1998

(86) PCT No.: PCT/CH98/00420

§ 371 Date: Jun. 15, 1999

§ 102(e) Date: Jun. 15, 1999

(87) PCT Pub. No.: WO99/24335

PCT Pub. Date: May 20, 1999

(30) Foreign Application Priority Data

Nov. 5, 1997 (CH) .................................................. 2559 97

(51) Int. Cl.$^7$ .............................. B65G 27/02; B65G 11/12
(52) U.S. Cl. ............................................... 198/756; 193/23
(58) Field of Search .................................. 198/756, 360; 193/2 R, 4, 16, 21, 22, 23, 29

(56) References Cited

U.S. PATENT DOCUMENTS

| | | | |
|---|---|---|---|
| 767,713 | * 8/1904 | Raygor et al. | 193/23 |
| 789,135 | * 5/1905 | Baggaley | 193/23 |
| 2,799,378 | * 7/1957 | English | 193/23 |
| 2,842,242 | * 7/1958 | Patterson | 193/23 |
| 3,827,578 | 8/1974 | Hough | 214/16 R |
| 4,347,922 | * 9/1982 | Curry et al. | 193/23 |
| 5,024,320 | * 6/1991 | Musschoot | 198/756 |
| 5,931,286 | * 8/1999 | Illi | 198/756 |

FOREIGN PATENT DOCUMENTS

| | | |
|---|---|---|
| 0549533 | 6/1993 | (EP) . |
| 2537638 | 6/1984 | (FR) . |
| 1356579 | 6/1974 | (GB) . |
| 9626873 | 9/1996 | (WO) . |

* cited by examiner

*Primary Examiner*—Dean J. Kramer
(74) *Attorney, Agent, or Firm*—Edwin D. Schindler

(57) ABSTRACT

A vibrating conveyor having a circular or helical conveying conduit driven with a vibrating motion by way of an electromagnet having alternating voltage. The conveying conduit emerges, at its end, into an overflow chute constructed in the form of a channel switching system. An overflow channel oscillates with a reciprocating motion about a pivoting shaft. Mechanical and electrical control devices are provided, so that the overflow channel can be brought into variable oscillating positions. The overflow channel includes a U-shaped section, pressing radially on a sliding surface, forming a circular zone and fixed on a pivoting shaft mounted on the sliding surface. This section is driven by a reciprocating motion in the peripheral direction of the circular zone about the pivoting shaft. Through the pivoting shaft, this section is rigidly connected to a guide rail open downwardly, arranged beneath the sliding surface and extending parallel thereto. In this guide rail is housed a cam, which is set on a control disk, arranged parallel to the sliding surface, such that when the control disk is driven in rotation by an electric motor, the cam causes the guide rail to oscillate with a reciprocating motion and, thus, the overflow channel above the sliding surface.

7 Claims, 3 Drawing Sheets

VIBRATING CONVEYOR WITH DISTRIBUTION CHANNEL SWITCHING SYSTEM

Figure 1:
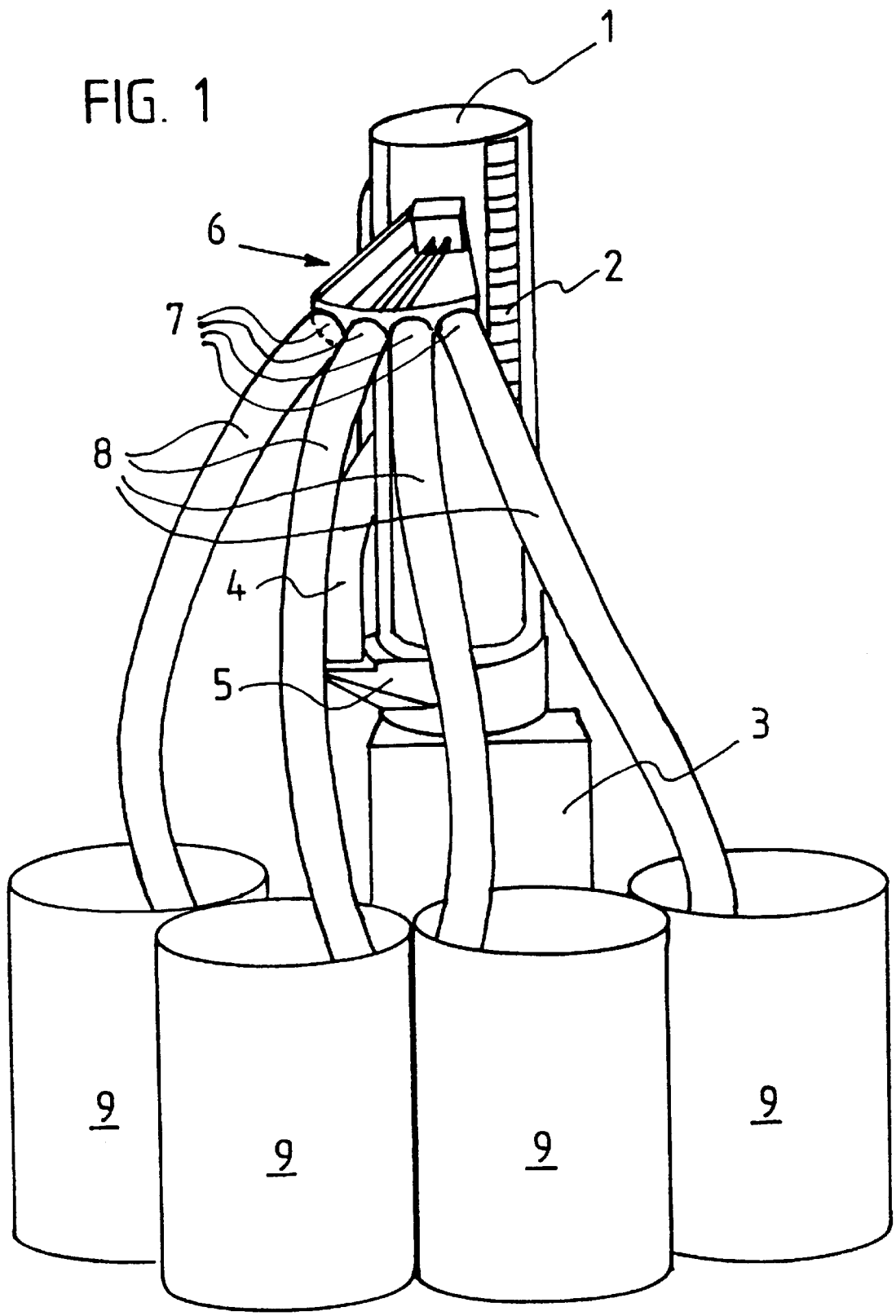

This invention relates to a vibration conveyor as used in a variety of embodiments for conveying small parts. Vibration conveyors of this type work on the principle that a spiral or circular-shaped track is made to vibrate, with the movement essentially comprising a horizontal and a vertical component. The material to be conveyed may be small parts made of highly varied materials, which have to be e.g. sorted, inspected, cleaned and filled into drums as part of a production process. Sorting pots driven in this manner cause the small parts inside to move around the edge of the sorting pot, with only those small particles that find themselves in a certain position being able to negotiate a corresponding sorting passage, whilst the others fall back into the sorting pot. Another special version of a vibration conveyor serves to simultaneously smooth and remove dust from pharmaceutical products such as tablets or pills. Vibrations conveyors of this type are fitted with a drive unit consisting of an electromagnet to which alternating voltage is applied. On top of the electromagnet there is a vibration plate, to which the parts of the vibration conveyor that are to be made to vibrate are securely attached. On the opposite side of the electromagnet there is a suspended complementary vibration plate, on which the electromagnet is vertically adjustably attached, with the vibration plate and the complementary vibration plate being elastically connected to each other. This elastic connection can consist, for example, of leaf spring sets disposed at an oblique angle to the winding axis of the electromagnet so that when the vibration plate is made to vibrate, it receives both a vertical and horizontal vibration component. The base construction is connected to the vibrating part solely by means of the vibration nodes of the leaf spring sets, and so the base construction remains stationary in operation and is not exposed to any vibration.

Such prior art vibration conveyors have a dispensing chute through which the conveyed parts fall into a drum. In practice, the drum is placed under the dispensing chute on a weighing device and filled up until the target weight is achieved, or the drum is filled up to a visual level indicator mark. The vibration conveyor is then switched off, or the dispensing chute is blocked until a new, empty drum can be positioned. Sometimes, several drums are arranged next to each other and a swivelling funnel device into which the small parts fall as they leave the dispensing chute is moved by hand from one drum to the next as each drum fills up with the vibration conveyor in operation all the time. After filling a number of drums, e.g. enough to load on a pallet, the vibration conveyor has to be switched off, the pallet with the full drums has to be removed, and another pallet with empty drums repositioned under the dispensing chute. With the increasing automation of the process of transferring small parts to containers it would be preferable to organize the filling up of individual drums without any manual intervention.

Hence it is the task of this invention to provide a vibration conveyor with a device for automatically filling up several containers.

This task is solved by a vibration conveyor with a spiral or circular-shaped conveyor channel which can be made to vibrate by means of an electromagnet under alternating voltage and whose end opens out into a dispensing chute, it being characterized in that the dispensing chute is contrived as a distribution gate which comprises a dispensing channel that can be moved to and fro around a pivot axis by an electric motor, with mechanical and electrical control means for guiding the dispensing channel to different positions in line with a control program.

An advantageous embodiment of this vibration conveyor with distribution gate is illustrated in the drawings; it will be described below with reference to these drawings, and the function of the individual parts will be explained and commented on.

Figure 2:
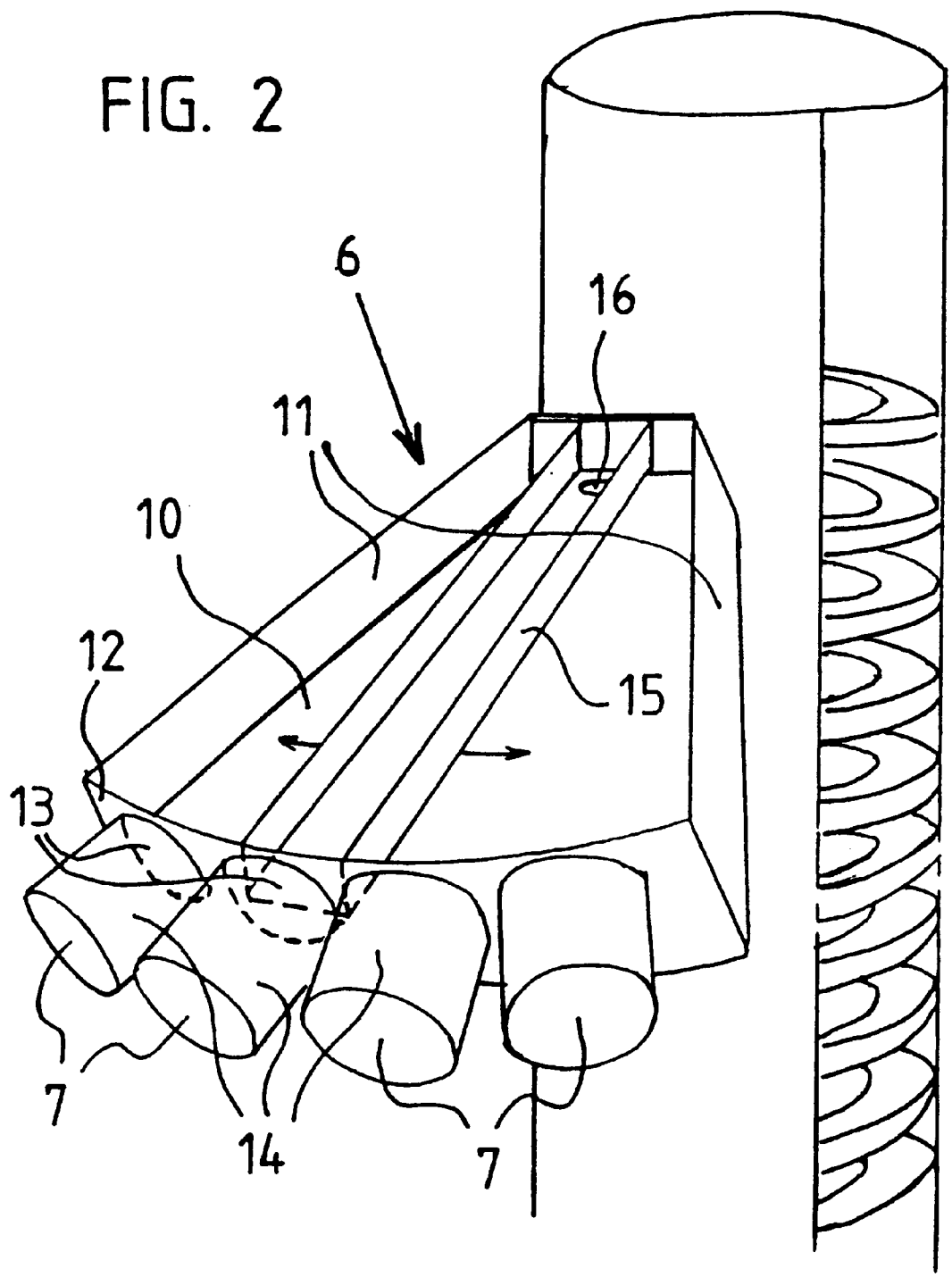
Figure 3:
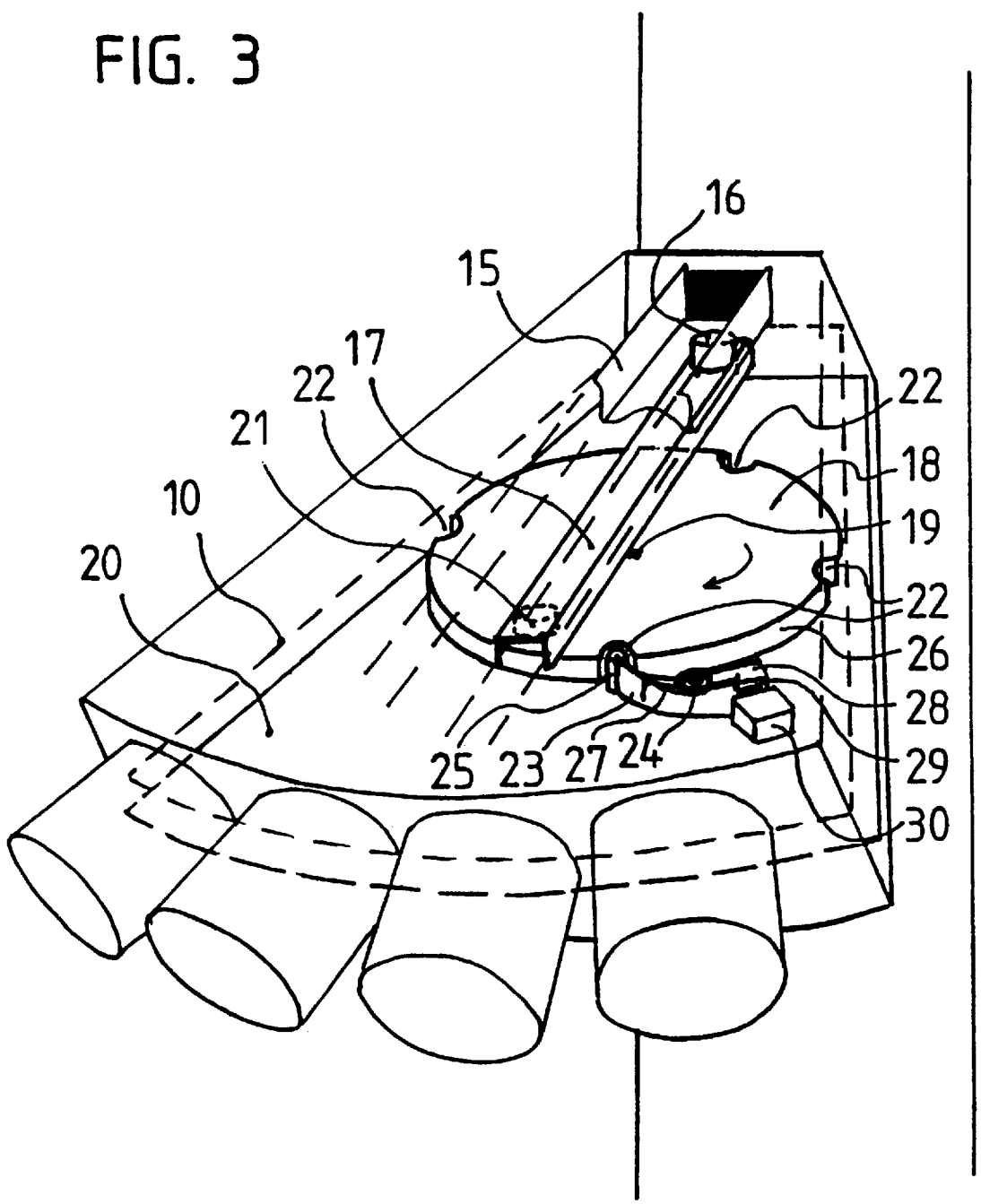

FIG. 1: is an overall view of the vibration conveyor with distribution gate and several drums in operation;

FIG. 2: shows the distribution gate on its own;

FIG. 3: shows the drive and control mechanism of the distribution gate.

FIG. 1 shows the vibration conveyor 1, which has here an upwardly disposed spiral-shaped conveyor channel 2, which is encased by a cylindrical perspex jacket. Underneath the perspex jacket is the drive unit 3 with the vibration plates connected via leaf spring sets and the electromagnet disposed between these vibration plates on the lower vibration plate, to which alternating voltage is applied to make the two vibration plates vibrate with horizontal and vertical components. Conveyor channel 2 is secured on top of the upper vibration plate. The housing of the drive unit 3 and the perspex jacket of the conveyor tower remain vibration-free because they are only connected to the vibration plates and the electromagnet via the vibration nodes of the leaf spring sets. The small parts enter vibration conveyor 1 via the feed pipe 4. They slide through the inlet chute 5 into the conveyor channel 2, on which they move upwards as it oscillates and vibrates. If said small parts are e.g. tablets, they are simultaneously smoothed and the resultant dust is sucked away, via a central extraction system, through a perforated pipe around which runs conveyor channel 2. During the conveying process the small parts move through a height equal to the vertical elevation between the inlet chute 5 and the inlet edge of the dispensing chute 6. From this point they are to be automatically targeted in pre-programmed volumes into waiting drums 9. For this purpose dispensing chute 6 is contrived as a distribution gate. In the example illustrated, the small parts can be guided through four separate outlets 7 into any one of the filler hoses 8 which guide the small parts into a waiting drum 9. This process of distributing specific volumes of small parts into different drums 9 is performed automatically by the distribution gate 6 which can be programmed and operated by an electric motor.

FIG. 2 shows this distribution gate 6 on its own. It has a circular segment-shaped smooth surface 10, preferably made from a chromium steel sheet, which terminates here on both sides in an edge 11 that is bent vertically upwards. Attached to the front end there is an edge 12 with several outlet holes 13, to each of which is attached a sleeve 14 for connecting a filler hose. Edge 12 overlaps smooth surface 10 downwards, and the outlet holes 13 are arranged so that smooth surface 10 finishes up at about the same height as their horizontal diameter. As can be seen in FIG. 1, the overall distribution gate 6 is attached to vibration conveyor 1 in a downwardly inclined position. Lying on top of smooth surface 10 there is a dispensing channel 15 in the form of a U-profile made of chromium steel or plastic. At the top, it is pivotably attached to the chromium steel sheet forming smooth surface 10 via an axis 16 that is rigidly connected with it. This allows dispensing channel 15 to be pivoted around axis 16 so that its lower end can be moved in front of any of outlet holes 13 as required. Hence the small parts that slide down from the top through dispensing channel 15 travel through the selected outlet hole 13 into the connected filler hose 8, as shown in FIG. 1.

FIG. 3 shows an example of an embodiment for the drive and control mechanism for operating the distribution gate. This Figure shows the elements of the distribution gate below smooth surface 10, which is only indicated here by a dashed line. Dispensing channel 15, which is only partly drawn in here, lies on top of this smooth surface 10. This dispensing channel 15 is pivotably attached to smooth surface 10 via co-rotating axis 16. Running parallel to dispensing channel 15 underneath smooth surface 10, there is a guide rail 17, which is also rigidly secured to axis 16 so that its pivoting movement around axis 16 is conveyed via the latter to dispensing channel 15. This guide rail 17 consists of a U-profile made from chromium steel or plastic which is integrated such that it is open facing downwards. Lying underneath guide rail 17, a control disk 18 is rotatably mounted around an axis 19, with this axis 19 being mounted in an assembling sheet 20 that lies underneath control disk 18 and runs parallel to smooth surface 10. Axis 19 is driven by an electric motor which is attached to the underneath of assembling sheet 20 and is not visible here. At its periphery, control disk 18 has a cam 21 which fits inside the inside width of the U-profile that forms guide rail 17. When control disk 18 rotates, cam 21 circles round the central axis 19 of control disk 18, carrying guide rail 17 along with it, which in turn carries dispensing channel 15 along with it via pivot axis 16. To stop dispensing channel 15 precisely in front of whichever outlet hole 13 is required, several recesses 22 are contrived around the periphery of control disk 18. A contact rocker 23 is pivotably mounted on assembling sheet 20 in the plane of control disk 18 by means of axis 24. At its front end, the contact rocker 23 has a roller 25 which rolls along the peripheral surface 26 of control disk 18 when the latter rotates. A spring 27 ensures that the front end of contact rocker 23 with the roller 25 is kept pressed against the peripheral surface 26 of control disk 18. The roller 25 on the contact rocker 23 falls into each recess 22 it reaches as control disk 18 rotates. The resultant pivoting movement of contact rocker 23 causes its rear part 28 to pivot outwards. This in turn closes an electric contact 29 on switch 30. The sequence of the contacts that take place as control disk 18 rotates corresponds to the individual positions of dispensing channel 15. Using an associated memory-programmable electric control device (SPS) a program can be set to define e.g. how long a certain position should be maintained, to which outlet hole 13 dispensing channel 15 should then be pivoted by rotating control disk 18 with the electric motor, how long it should remain there, and which outlet hole 13 it should be directed to afterwards etc. The program can e.g. be configured to serve the four outlet holes 13 shown in FIG. 1 consecutively, and to have dispensing channel 15 remain for a set time at each outlet hole 13, or until an external signal supplies the impulse to pivot dispensing channel 15 into its next position. An external signal of this type can come e.g. from a weighing device on which the drum being filled is positioned, which sends an impulse to the SPS of the distribution gate once a certain target weight has been achieved. The signal could also be supplied from an optical detector which measures the fill-level of the individual drums. This allows one to program a distribution cycle for continuously filling one drum, after which an immediate start is made on filling the next awaiting drum so that the positioning and removal of the drums can take place automatically on a conveyor belt, or the full drums can simply be replaced with empty ones by an operator. The SPS can be programmed to e.g. switch off the vibration conveyor when the signals from the weighing device or the optical detector indicate that every drum is full.

What is claimed is:

1. A vibration conveyor comprising a spiral or circular-shaped conveyor channel, vibratable via an electromagnet under alternating voltage and whose end opens out into a dispensing chute, wherein the dispensing chute is contrived as a distribution gate with a dispensing channel having a U-profile and pivotable to and fro, which lies on top of a circular segment-shaped smooth surface in a radial direction and is pivotable around a pivot axis traversing said smooth surface, and is rigidly connected via this pivot axis with a guide rail that is open at the bottom and disposed underneath said smooth surface, with mechanical and electrical control means for guiding dispensing channel to different positions by moving said guide rail to and fro in line with a program via a cam that is mounted on a periphery of a control disk disposed parallel to, and underneath, said smooth surface, and projects upwards into said guide rail, so that when said control disk is rotated by an electric motor in response to mechanical and electrical control means, said cam engages said guide rail and moves it to and fro.

2. The vibration conveyor of claim 1, wherein said mechanical and electrical control means are contrived by said control disk having several recesses distributed around its periphery, into which a peripherally disposed, spring-loaded contact rocker pivots, thereby activating a switch and stopping the rotation of said control disk by the electric motor, so that dispensing channel can be brought to rest in different positions.

3. The vibration conveyor of claim 2, wherein at a front end of said contact rocker there is a rollers which, when rotates, rolls around the latter's peripheral surface and into respective recesses, thereby closing an electric contact.

4. A vibration conveyor comprising a spiral or circular-shaped conveyor channel, vibratable via an electro-magnet under alternating voltage and whose end opens out into a dispensing chute, wherein the dispensing chute is contrived as a distribution gate with a dispensing channel pivotable to and fro, which lies on top of a circular segment-shaped smooth surface in a radial direction and is pivotable around a pivot axis traversing said smooth surface, and is rigidly connected via this pivot axis with a guide rail that is open at the bottom and disposed underneath said smooth surface, with mechanical and electrical control means for guiding dispensing channel to different positions by moving said guide rail to and fro in line with a program, and a memory-programmable control device (SPS) by which the distribution gate is controllable so that said dispensing channel can be directed to any required dispensing position in line with a program, in a chosen sequence and for a set period of time.

5. The vibration conveyor of claim 4, wherein the dispensing channel is a U-profile, and in that the downwardly open said guide rail to which it is rigidly connected underneath said smooth surface by means of pivot axis is pivotable to and fro via a cam that is mounted on a periphery of a control disk disposed parallel to, and underneath, said smooth surface, projects upwards into said guide rail, so that when said control disk is rotated by an electric motor in response to mechanical and electrical control means, said cam engages said guide rail and moves it to and fro.

6. The vibration conveyor of claim 5, wherein said mechanical and electrical control means are contrived by said control disk having several recesses distributed around its periphery, into which a peripherally disposed, spring-loaded contact rocker pivots, thereby activating a switch and stopping the rotation of said control disk by the electric motor, so that dispensing channel can be brought to rest in different positions.

7. The vibration conveyor of claim 6, wherein at a front end of said contact rocker there is a roller, which, when rotates, rolls around the latter's peripheral surface and into respective recesses, thereby closing an electric contact.

* * * * *